United States Patent [19]

Suzuki

[11] Patent Number: 6,005,677

[45] Date of Patent: Dec. 21, 1999

[54] FACSIMILE DEVICE AND A METHOD OF FACSIMILE COMMUNICATION

[75] Inventor: Hironobu Suzuki, Yokohama, Japan

[73] Assignee: Ricoh Company, Ltd., Tokyo, Japan

[21] Appl. No.: 08/918,600

[22] Filed: Aug. 22, 1997

[30]    Foreign Application Priority Data

Aug. 23, 1996   [JP]   Japan ................................. 8-239968

[51] Int. Cl.$^6$ ................................................. H04N 1/32
[52] U.S. Cl. ......................... 358/442; 358/404; 358/407; 358/440
[58] Field of Search .................................. 358/402, 403, 358/404, 407, 440, 444, 442; 370/471, 473, 474, 428

[56]            References Cited

U.S. PATENT DOCUMENTS

| | | | |
|---|---|---|---|
| 5,410,416 | 4/1995 | Amberg et al. | 358/407 |
| 5,521,719 | 5/1996 | Yamada | 358/440 |
| 5,546,388 | 8/1996 | Lin | 370/389 |
| 5,805,298 | 9/1998 | Ho et al. | 358/402 |

FOREIGN PATENT DOCUMENTS

97/10668   3/1997   WIPO .

Primary Examiner—Amelia Au
Assistant Examiner—Jingge Wu
Attorney, Agent, or Firm—Cooper & Dunham LLP

[57]            ABSTRACT

A facsimile device includes local area network communication controlling means for exchanging data between the facsimile device and the terminal of a correspondence partner through a local area network connected to an internet. An exchanging network communication controlling means is provided for exchanging image information between the facsimile device and the terminal of the correspondence partner through an exchanging network in accordance with a predetermined facsimile transmitting procedure. Telephone number converting table means is provided for registering telephone numbers used to place a call by use of the exchanging network and a group of addresses for transmitting signals by use of the local area network, for the terminals of the respective correspondence partners. At the time of performing the transmitting operation, when a designated telephone number has been already registered in the telephone number converting table means, an address corresponding thereto is looked up, and image information is transmitted to the looked up address by use of the local area network communication controlling means.

14 Claims, 10 Drawing Sheets

**\*\*\* REPORT OF COMMUNICATION RESULT \*\*\***

| DATE |
| --- |

| CORRESPONDING PARTNER | NUMBER | RESULT |
| --- | --- | --- |
| TOKYO HEAD OFFICE | 133.139.164.34 | OK |
| YOKOHAMA BRANCH OFFICE | 045-678-9012 | OK |
|  |  |  |
|  |  |  |

FIG. 6

| ADDRESS OF TRANSMITTING SIDE |
| --- |
| ADDRESS OF RECEIVING SIDE |
| INFORMATION OF RELAY DESTINATION |
| IMAGE INFORMATION DATA |

FIG. 8

FACSIMILE DEVICE AND A METHOD OF FACSIMILE COMMUNICATION

BACKGROUND OF THE INVENTION

1. Field of the Invention

The present invention relates to a facsimile device having both a first local area network communicating function and a second communicating function. The first local area network communicating function exchanges data such as ordinary data or electronic mail data between the facsimile device and a terminal of a corresponding partner through the local area network connected to an internet. The second communicating function exchanges image information between the facsimile device and the terminal of the corresponding partner through an exchanging network in accordance with a predetermined facsimile transmitting procedure.

2. Description of the Related Art

In recent years, as a result of popularization of the internet, facsimile devices have been used which provide functions for connecting a local area network to the internet and exchanging image information between the terminals connected to the different local area networks through the internet.

Furthermore, another type of facsimile device has been used which is further provided with a general exchanging network and communication medium of ISDN which is capable of also communicating with the correspondence partner terminals respectively connected to the general exchanging network and the communication medium of ISDN.

However, in such facsimile devices as mentioned above, it is necessary to designate whether the internet or the general exchanging network is to be used at the time of performing the operation of transmitting the image information and it is further necessary to confirm whether the correspondence partner terminal is connected to the internet or the general exchanging network.

SUMMARY OF THE INVENTION

The present invention relates to a facsimile device comprising local area network communication controlling means for exchanging data between the facsimile device and the terminal of a correspondence partner through a local area network connected to an internet. An exchanging network communication controlling means is provided for exchanging image information between the facsimile device and the terminal of the correspondence partner through an exchanging network in accordance with a predetermined facsimile transmitting procedure. Telephone number converting table means registers telephone numbers used to place a call by use of the exchanging network and a group of addresses for transmitting signals by use of the local area network, for the terminals of the respective correspondence partners. At the time of performing the transmitting operation, when a designated telephone number has been already registered in the telephone number converting table means, an address corresponding thereto is looked up, and image information is transmitted to the looked up address by use of the local area network communication controlling means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is an outline view showing an example of the communication result report;

FIG. 8 is an outline view showing an example of the format for the transmission data;

DESCRIPTION OF THE PREFERRED EMBODIMENTS

Figure 1:
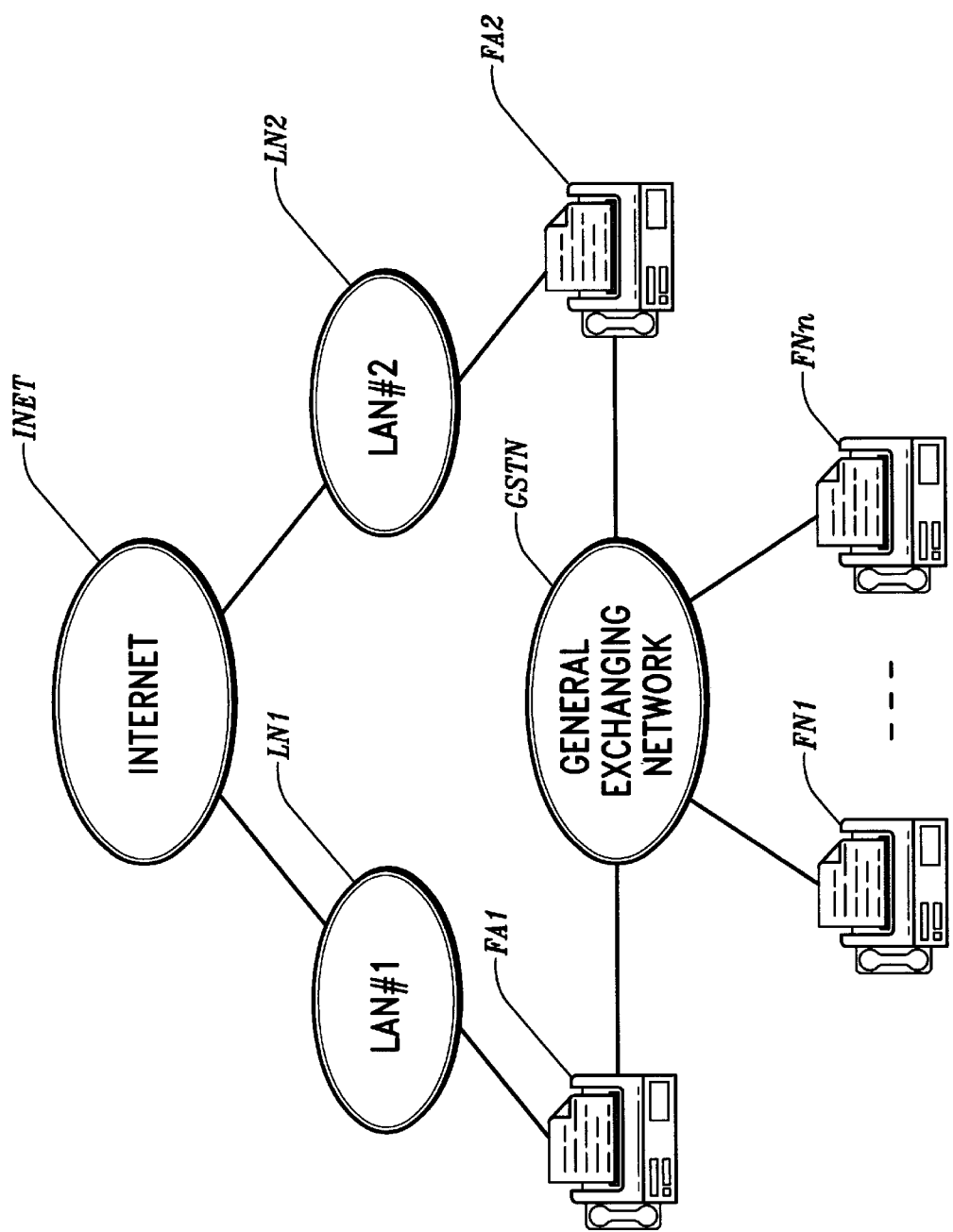
FIG. 1 is an outline view for explaining an example of the facsimile communication network system relating to an embodiment according to the present invention.

An actual embodiment of the present invention is explained in detail hereinafter, referring to the accompanying drawings in which FIG. 1 is an outline view for explaining an example of a facsimile communication network system relating to an embodiment according to the present invention.

In FIG. 1, a facsimile device FA1 is connected to a local area network LN1 and further connected to a general exchanging network such as a General Switched Telephone Network (GSTN). Another facsimile device FA2 is connected to a local area network LN2 and also connected to the general exchanging network GSTN. Consequently, both facsimile devices FA1 and FA2, respectively, have a capability of performing data communication with the local area networks LN1 and LN2 in the state of being respectively connected thereto and a capability of performing data communication with the general exchanging network GSTN in the state of being connected thereto.

On the other hand, facsimile devices FN1 through FNn are connected only to the general exchanging network GSTN. Therefore, the facsimile devices FN1 through FNn only have the capability of performing data communication with the general exchanging network GSTN in the state of being connected thereto. Namely, facsimile devices FN1 through FNn are ordinary facsimile devices which are only capable of using the general exchanging network GSTN.

In such construction, the local area network LN1 and the local area network LN2 are respectively connected to an internet INET. Consequently, the facsimile device FA1 connected to the local area network LN1 and its data terminal device can mutually perform data communication through the internet INET. Facsimile device FA2 connected to the local area network LN2 and its data terminal device (not shown) can also mutually perform data communication through the internet INET.

Furthermore, the facsimile device FA1 and the facsimile device FA2 can communicate data with each other through the general exchanging network GSTN. In addition, facsimile devices FA1 and FA2 and facsimile devices FN1 through FNn can mutually communicate data with each other and with facsimile devices FA1 and FA2 through the general exchanging network GSTN.

Figure 2:
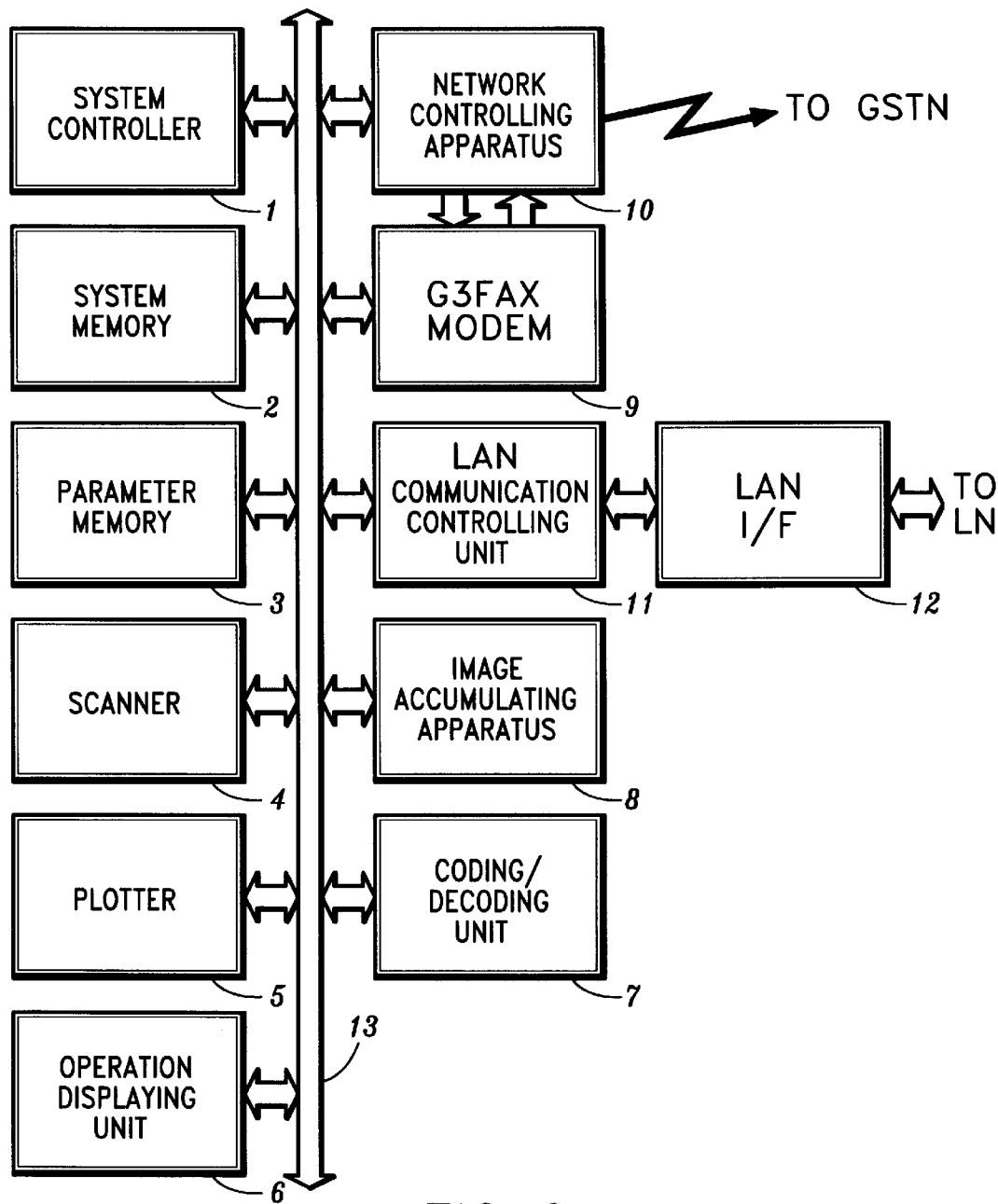
FIG. 2 is a block diagram showing a construction example of the facsimile device of the present invention.

FIG. 2 shows an example of a block diagram of the construction of facsimile devices FA1 and FA2. In FIG. 2, a system control section 1 performs various control processings such as control processing for the respective parts of the facsimile device and the processing of the facsimile transmission control procedure, etc., and a system memory 2 stores the control processing program executed by the system control section 1 and various other data required at the time of executing the processing program and provides a work area for the system control section 1. A parameter memory 3 stores various information inherent in the facsimile device.

A scanner 4 reads out an image on a manuscript document, for example, with a predetermined resolution. A plotter 5 records and outputs the image with the predetermined resolution. An operation displaying section 6 controls the operation of the facsimile device. Operation displaying section 6 is composed of various operation keys and various displaying units.

A coding/decoding section 7 performs coding and compressing of the image signal and further performs decoding of the image signal thus coded and compressed in order to return the image signal to its initial state. An image accumulating apparatus 8 stores large amounts of image information which has been coded and compressed.

A group-3 facsimile modem 9 which realizes the modem function for the group-3 facsimile device is provided with a low-speed modem function (V.21 modem) for exchanging the transmission procedure signals and a high-speed modem function (V.17 modem, V.34 modem, V.29 modem, and V.27 ter modem) for mainly exchanging the image information signals.

A network controlling apparatus 10 is used for connecting the facsimile device to the public telephone lines network and provided with functions for automatic signal transmission and reception.

A local area network communication controlling section 11 exchanges various data between the facsimile device and other data terminal apparatuses through the local area networks LN1 and LN2 and the internet INET. A local area network interface circuit 12 connects the facsimile device to the local area networks LN1 and LN2.

These elements; the control section 1, the system memory 2, the parameter memory 3, the scanner 4, the plotter 5, the operation displaying section 6, the coding/decoding section 7, the image accumulating apparatus 8, the group-3 facsimile modem 9, the network controlling apparatus 10, and the local area network communication controlling section 11 are connected to the internal bus 13. The exchange of data between those respective elements is performed mainly through internal bus 13.

Furthermore, the exchange of data between the network controlling apparatus 10 and the group-3 facsimile modem 9 is performed directly therebetween.

Furthermore, the parameter memory 3 for the facsimile devices FA1 and FA2 stores, for the respective addresses, a telephone number conversion table representing the relationship between the telephone number referred to at the time of connection through the general exchanging network GSTN and the address (IP address) referred to at the time of connection through the local area networks LN1 and LN2 and the internet INET.

Figure 3:
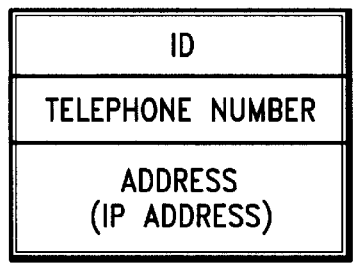
FIG. 3 is an outline view showing an example of one element of the telephone number converting table.

An example of one element of this telephone number conversion table is shown in FIG. 3.

The (one) element of the telephone number conversion table is composed of the ID for identifying the respective elements, the telephone number, and the internet address (IP address).

Figure 4:
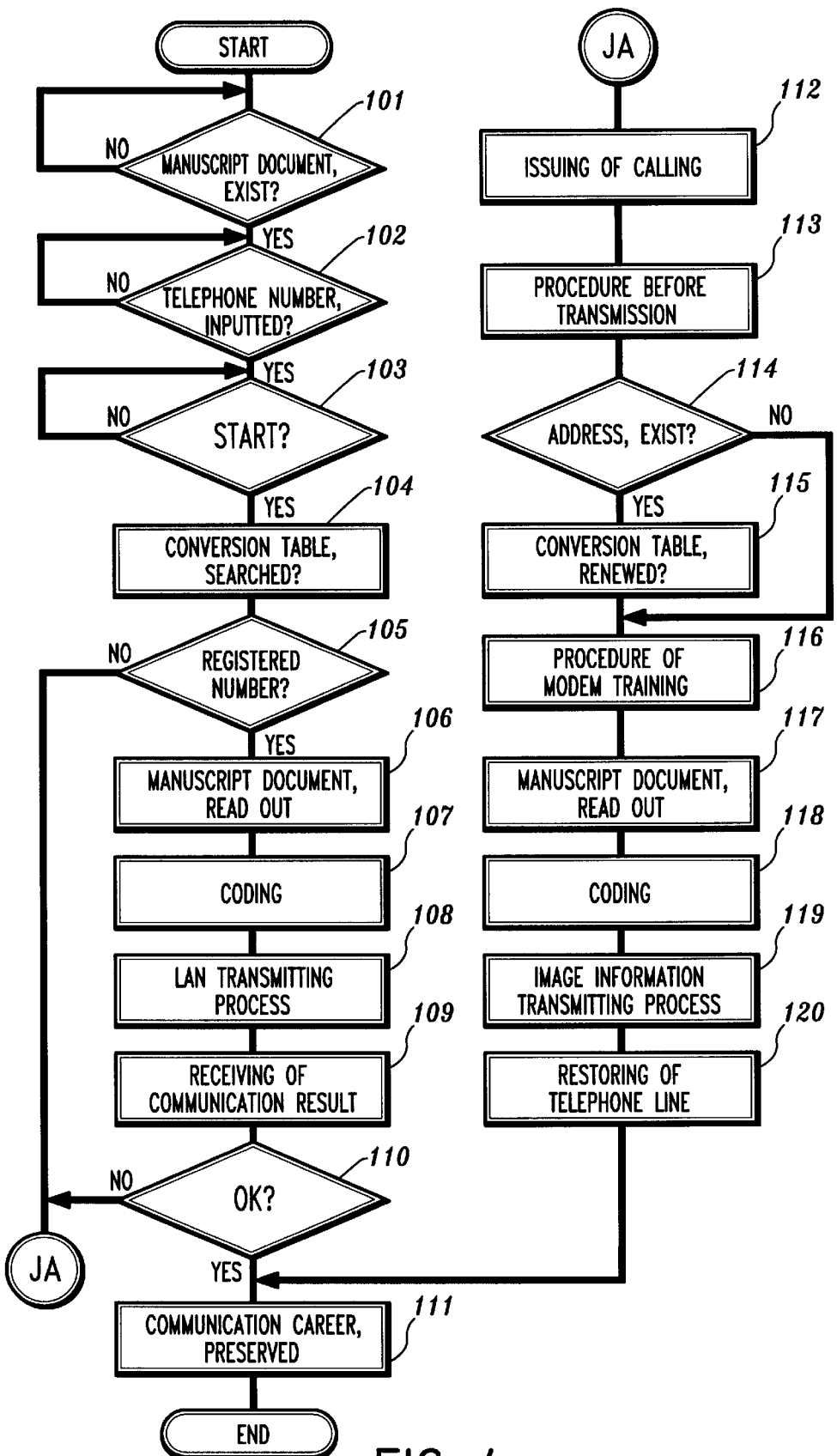
FIG. 4 is a flow chart showing an example of the processing at the time of facsimile device transmission.

FIG. 4 shows an example of processing performed at the time of signal transmission by the facsimile devices FA1 and FA2 in such construction as mentioned heretofore.

At first, in step 101 it is determined whether a manuscript document has been set on the scanner 4. If the result of step 101 is YES, a determination is made in step 102 whether a telephone number has been inputted from the operation displaying section 6. If the result of step 102 is YES, the user operates the operation displaying section 6 and the scanner 4 waits until the user issues the command of starting the operation of the signal transmission (e.g., the NO loop of step 103).

When the user issues the command for starting the operation of the signal transmission and thereby the result of step 103 becomes YES, the telephone number conversion table is searched in order to obtain the IP address (step 104) corresponding to the telephone number inputted at that time.

When the inputted telephone number is judged to be a number registered in the telephone number conversion table (the result of step 105 is YES), the image on the manuscript document set in the scanner 4 at that time is read out (step 106). The image data on the respective pages obtained thereby are coded and compressed by the coding/decoding section 7 (step 107), and the image information thus obtained is transmitted to the IP address of the destination (correspondence partner) by use of the local area network communication controlling section 11 (step 108). At this time, the local area network communication controlling section 11 transmits the image information data to the IP address obtained during the search performed in step 104 in accordance with the predetermined protocol employed at the time of transferring (transmitting) the file.

Next, when the facsimile device receives the result of the communication from the terminal of the correspondence partner (step 109), the facsimile device determines whether the operation of receiving the image information by the correspondence partner has been performed normally (correctly) by referring to the received communication result (step 110). When the result of step 110 becomes YES, the device forms a communication career (history) signal regarding the image information transmission at that time and the communication history signal thus formed is stored (step 111).

Furthermore, when the inputted telephone number is judged to be a number not registered in the telephone number conversion table and the result of step 105 is NO, or when the result of the signal received at the terminal of the correspondence partner is inferior and the result of step 110 is NO, the calling signal is issued to the destination (correspondence partner) at the telephone number inputted at that time by use of the network controlling apparatus 10 (step 112). When the terminal of the correspondence partner responds to the signal arrival, the transmitting facsimile device executes a predetermined pre-transmission procedure process (step 113) and receives information such as the transmitting function of the terminal of the correspondence partner, etc.

In the pre-transmission procedure process, the facsimile device also searches whether the address information is included in the received non-standard function identifying signal NSF (step 114). When the result of the step 114 becomes YES, the information composed of the telephone number and the address at that time is added to the telephone number conversion table and thereby the telephone number conversion table is renewed and updated (step 115). When the result of step 114 is NO, step 115 is not executed and the flow proceeds directly to step 116.

Next, a predetermined modem training procedure is executed, to determine and set the speed of the modem employed at that time (step 116). The image on the manuscript document set on the scanner 4 is read out (step 117), and the image data of the respective pages obtained thereby are coded and compressed by the coding/decoding section 7 (step 118).

The image information thus obtained is transmitted to the terminal of the correspondence partner in accordance with the predetermined transmitting procedure (step 119). When the transmission of the image information is completed, the telephone line (circuit) is restored (step 120), and after step 111 is performed to save and preserve the communication career (history), the transmitting operation is completed.

Figure 5:
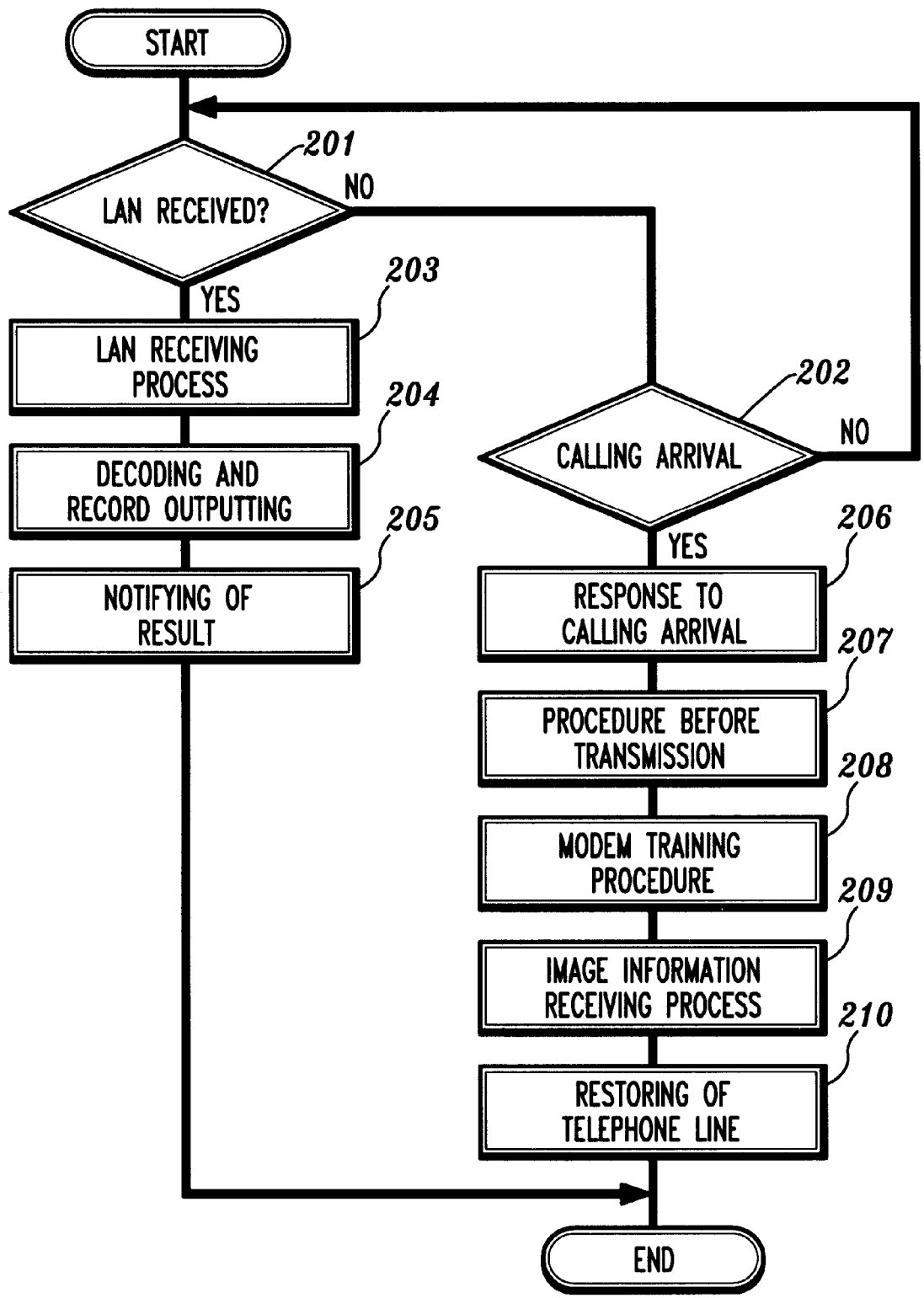
FIG. 5 is a flow chart showing an example of the processing at the time of facsimile device reception.

FIG. 5 shows an example of processing performed at the time of signal reception by the facsimile devices FA1 and FA2 in such construction as mentioned heretofore.

The facsimile device monitors whether a signal is received from the local area networks LN1 and LN2 (step 201) or the calling signal arrival is detected by the general exchanging network GSTN (step 202). When the signal is received from the local area networks LN1 and LN2 and the result of step 201 is YES, the facsimile device executes the local area network signal-receiving process for receiving and preserving the data in accordance with the predetermined protocol (step 203). When the reception of the image information is completed, the received image data are decoded (restored) to the original image data by the coding/decoding section 7, and the image data thus obtained are recorded and outputted by the plotter 5 (step 204). Next, information for notifying the transmitting terminal of the reception result of the image information is transmitted to the terminal of the signal transmitter (step 205), and the above operation is completed.

When the arrival of the calling signal from the general exchanging network GSTN is detected and the result of step 202 is YES, an operation for responding to the calling signal arrival is performed (step 206), and a predetermined pre-transmission procedure is executed (step 207). Moreover, in the pre-transmission procedure performed in step 207, the address information of the receiving terminal is included in the non-standard function identifying signal NSF sent to the transmitting terminal for notifying the non-standard transmission function of the receiving terminal to the terminal of the correspondence partner (e.g., the transmitting terminal).

Next, a predetermined modem training procedure is executed and the modem speed to be used is determined (step 208). Thereafter, a predetermined image information receiving procedure is executed and the image information is received and preserved (step 209). When the image information reception is completed, the telephone line (circuit) is restored (step 210). At this time, a series of the above-mentioned operations are completed. The received image information can then be decoded to the initial image data by the coding/decoding section 7, and the image data obtained thereby recorded and outputted from the plotter 5.

When the facsimile devices FA1 and FA2 accumulate a predetermined amount of communication career information, facsimile devices FA1 and FA2 create a communication result report as shown in FIG. 6. The report is recorded and outputted by the plotter 5.

As shown in FIG. 6, the communication result report is composed of a display column for displaying the name of the correspondence partner, a display column for displaying the address or the telephone number used, and a display column for displaying the communication result. By viewing the display column which displays the number called, the user can judge that the correspondence partner performed the communication by use of the general exchanging network GSTN when the display column displays the telephone number, and that the correspondence partner has performed the communication through the internet INET when the display column displays the address.

In such manner, according to the present invention, the telephone number and IP address of the correspondence partner can be known by referring to the telephone number conversion table. When the address is registered, the image information is transmitted through the internet INET. When the address is not registered, the image information is transmitted by use of the general exchanging network GSTN. Consequently, it is not necessary to perform the operation of selecting the connection network of the correspondence partner on all such occasions, and therefore the ease with which the facsimile device system is used can be largely improved.

Furthermore, in general, since the local area network is connected to the internet INET through the specified line, if the facsimile communication is performed through the internet INET, the communication cost can be largely reduced compared with the case of performing the facsimile communication by use of the general exchanging network GSTN, and thereby such facsimile device system can be very convenient and cost effective.

Figure 7:
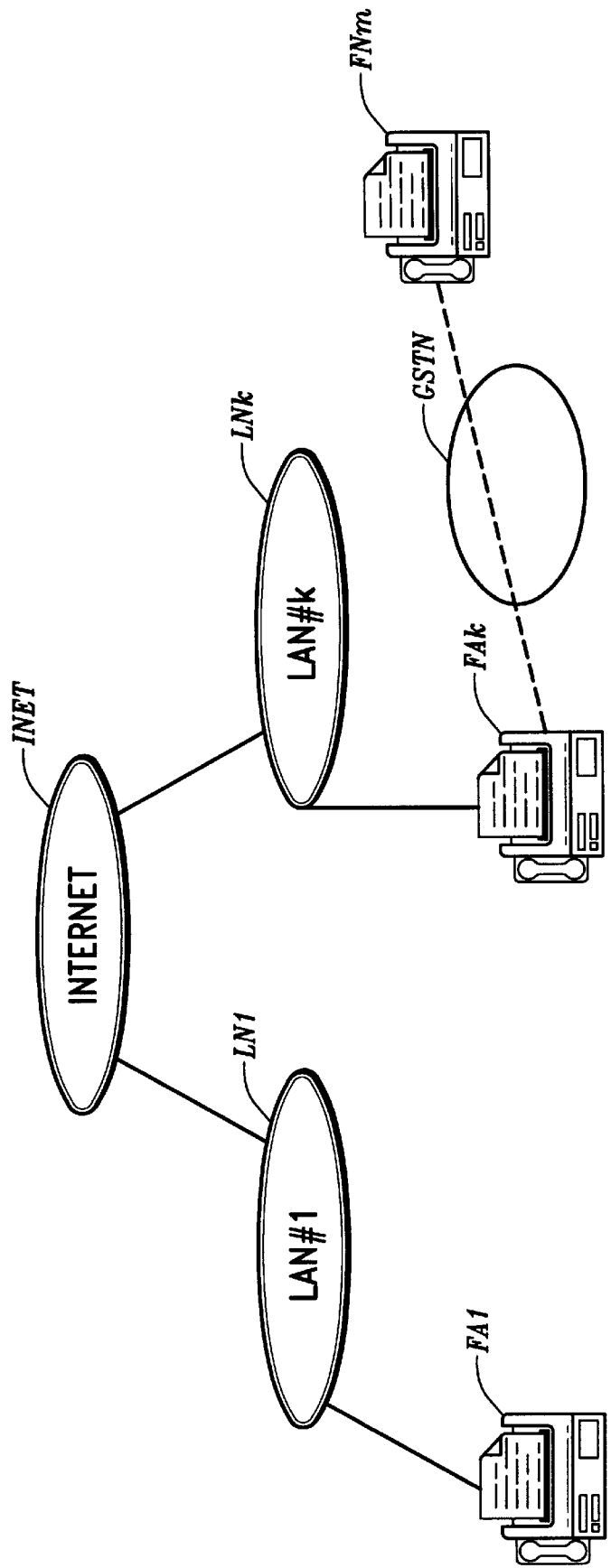
FIG. 7 is an outline view for explaining the relaying operation of the facsimile communication network system according to the present invention.

In the case of issuing the calling signal to the facsimile device connected to only the general exchanging network GSTN, if the correspondence partner is distant from the facsimile transmitter, the communication cost turns out to be inevitably high, requiring a long distance call. The system shown in FIG. 7 addresses this inconvenience. That is, in order to eliminate such inconvenience, it may be preferable to install a facsimile device FAk capable of communicating with the correspondence partner via the internet in relatively close proximity to the facsimile device connected to only the general exchanging network GSTN so that facsimile device FAk can relay the transmission of the image information from the facsimile connected only to the general exchanging network GSTN to the correspondence partner via the internet.

More specifically the facsimile device FA1 when functioning as the facsimile transmitter transmits transmission data of the type as shown in FIG. 8 to the relaying facsimile device FAk mentioned above. The transmission data are composed of the facsimile transmitter's address representing the address of the self terminal, the signal arrival address representing the address of the relaying apparatus, relayed address information including the telephone number for designating the address to which the data is to be relayed, and the image information data. When the data being sent to facsimile FAk is not the relay requesting transmission information, namely, in case that the information is for a direct transmission to facsimile FAk, the transmission data shown in FIG. 8 is set to all zeros (e.g. set to ineffective information).

In the facsimile device FAk, in case that the effective relayed address information is set to the image information data received through the local area network LNk via the internet INET, the received image information data is temporarily accumulated and the calling signal is issued to the telephone number contained in the relayed address information, and further, the image information thus accumulated is transmitted to the correspondence partner's address.

Figure 9:
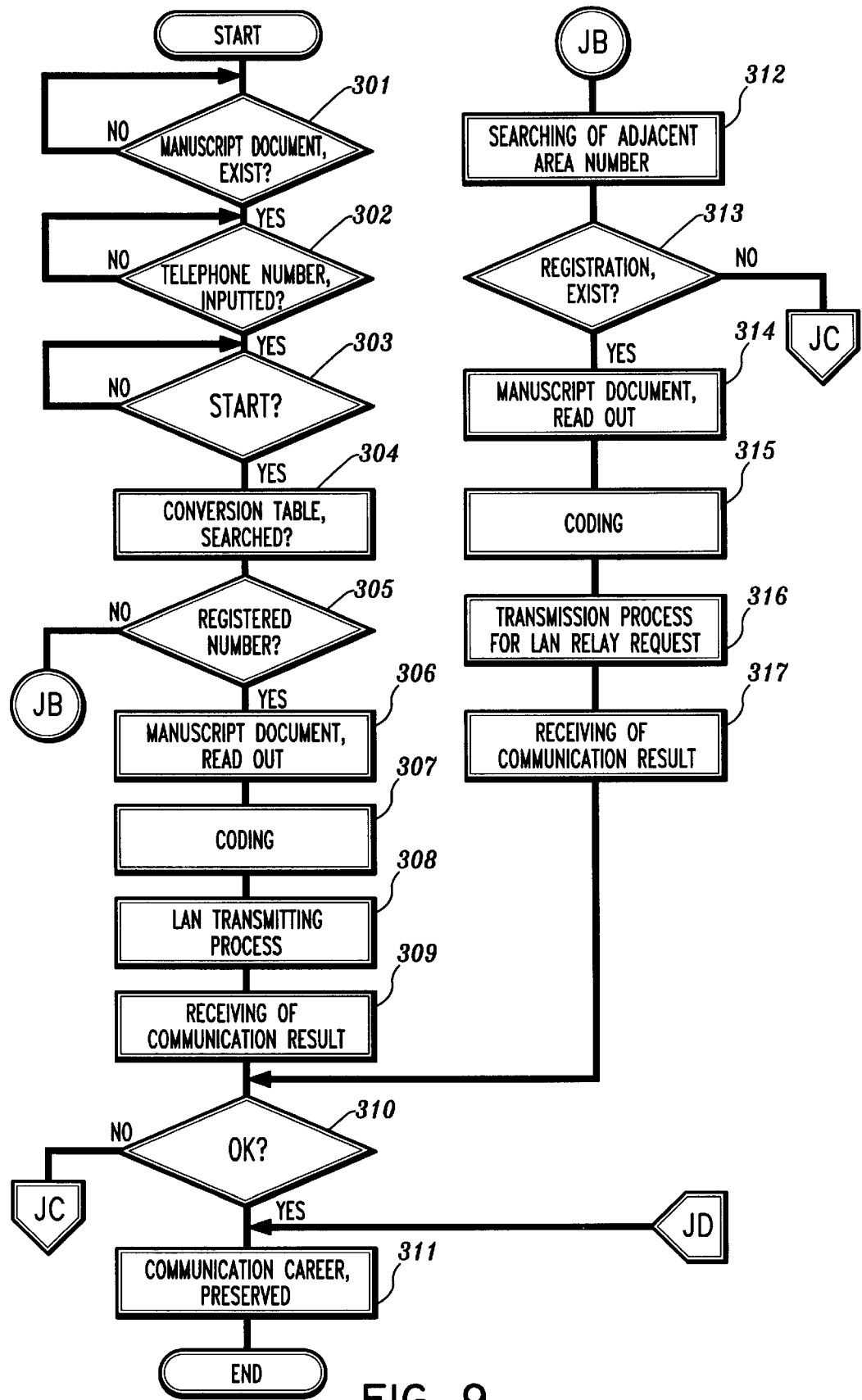
FIG. 9 is a flow chart showing a part of another example of the processing at the time of facsimile device transmission.
Figure 10:
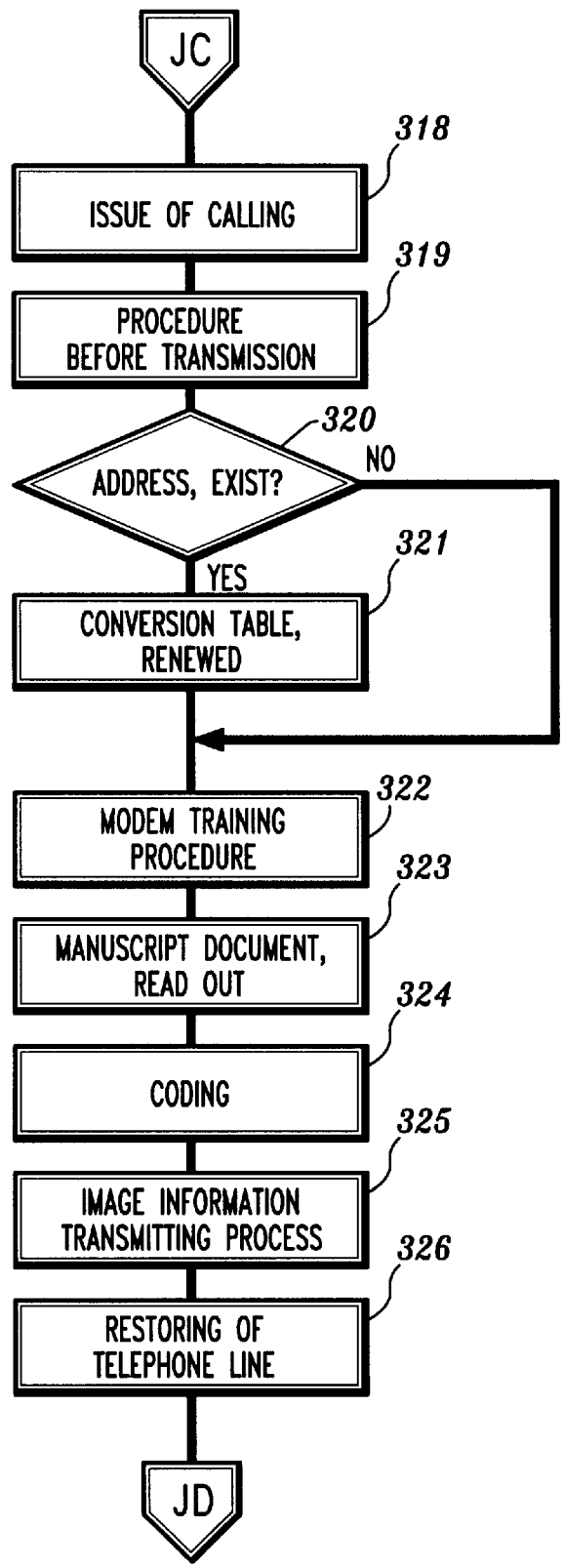
FIG. 10 is a flow chart showing another part of another example of the processing performed at the time of the facsimile device transmission.

Another example of the processing at the transmission side that can be performed is shown in FIG. 9 and FIG. 10. FIG. 9 is a flow chart showing a part of the example of the processing when the facsimile device performs the operation of the transmission, and FIG. 10 is a continuation flow chart showing another an part thereof. Steps 301–309 indicate steps for performing a direct communication and steps 312–317 indicate steps for performing a relay communication.

A determination is made in step 301 whether the manuscript document is set on the scanner 4. If yes in step 301, a determination is then made in step 302 whether the telephone number has been inputted from the operation displaying section 6. If yes in step 302, the user operates the operation displaying section 6 and the scanner 4 waits until the user issues the command to start the operation of the signal transmission (NO loop of the judgement 303).

When the user issues the command to start the signal transmission and thereby the result of step 303 is YES, the telephone number conversion table is searched in order to obtain the corresponding address (step 304) of the telephone number inputted at that time.

When the inputted telephone number is judged to be a number registered in the telephone number conversion table (Yes in step 305) the image on the manuscript document set in the scanner 4 at that time is read out (step 306). The image data on the respective pages obtained during the scan are coded and compressed by the coding/decoding section 7 (step 307). On the basis of the image information obtained thereby, the transmission data of the type as mentioned above are created (however, the ineffective data is set in the relayed address information), and the transmission data are transmitted to the address of the correspondence partner by the local area network communication controlling section 11 (step 308). At this time, the local area network communication controlling section 11 transmits the image information data to the address obtained as the result of searching performed in step 304 in accordance with the predetermined protocol employed at the time of transferring the file.

Next, when the facsimile device receives the result of the communication from the terminal of the correspondence partner (309), the device determines whether the operation of receiving the image information has been performed normally (correctly) by the result of the communication (step 310). When the result of the judgement performed in step 310 is YES, the device forms the communication career (history) signal regarding the image information transmission at that time and the communication history signal thus formed is (step 311).

Furthermore, when the inputted telephone number is judged to be a number not registered in the telephone number conversion table and the result of the judgement 305 is NO, whether or not a telephone number in the area adjacent to the inputted telephone number is registered is determined by searching the telephone number conversion table (step 312).

When a telephone number in the adjacent area is registered and thereby the result of step 313 becomes YES, the manuscript document image set on the scanner 4 at that time is read out (step 314), and the image data of the respective pages obtained thereby are coded and compressed by the coding/decoding section 7 (step 315). On the basis of the image information obtained thereby, the transmission data of the style as mentioned are created, and the transmission data thus created are transmitted to the address of the correspondence partner (step 316) by the local area network communication controlling section 11.

At this time, the local area network communication controlling section 11 transmits the image information data to the address registered in the telephone number found in step 312 in accordance with the predetermined protocol employed at the time of transferring the file. Furthermore, the original inputted telephone number is set to the relayed address information of the transmission data (e.g., the "Information of Relay Destination" section shown in FIG. 8), and the address registered in the telephone number found in step 312 is set to the signal-arrival address (e.g., the "Address of Receiving Side" section shown in FIG. 8).

Next, when the communication result is received from the terminal of the correspondence partner (step 317), the process proceeds to step 310 and the subsequent processes are executed thereby.

When a telephone number in an area adjacent to the inputted telephone number is judged not to be registered in the telephone number conversion table and the result of step 313 is NO, or when the reception result at the correspondence partner's terminal is inferior and the result of step 310 is NO, a calling signal is issued to the telephone number inputted at that time by use of the network controlling apparatus 10 (step 318). When the terminal of the correspondence partner responds to the signal arrival, the predetermined pre-transmission procedure process (step 319) is executed, and thereby the information such as the transmitting function of the correspondence partner's terminal, etc. is received.

Whether or not the address information is included in the non-standard function identifying signal NSF received in the pre-transmission procedure process is searched (step 320). When the result of step 320 is YES, the information composed of the telephone number and address is added to the telephone number conversion table, and thereby the telephone number conversion table is updated (step 321). Furthermore, when the result of step 320 is NO, step 321 is not performed.

Next, a predetermined modem training procedure is executed and the modem speed employed at that time is determined (step 322). The manuscript document image set on the scanner 4 is read out (step 323). The image data of the respective pages obtained thereby are transmitted to the terminal of the correspondence partner in accordance with the predetermined transmission procedure (step 325). When the transmission of the image information is completed, the telephone line (circuit) is restored (step 326). After the process is transferred to step 311 and preserves the correspondence career, the above-mentioned series of operations are completed.

Figure 11:
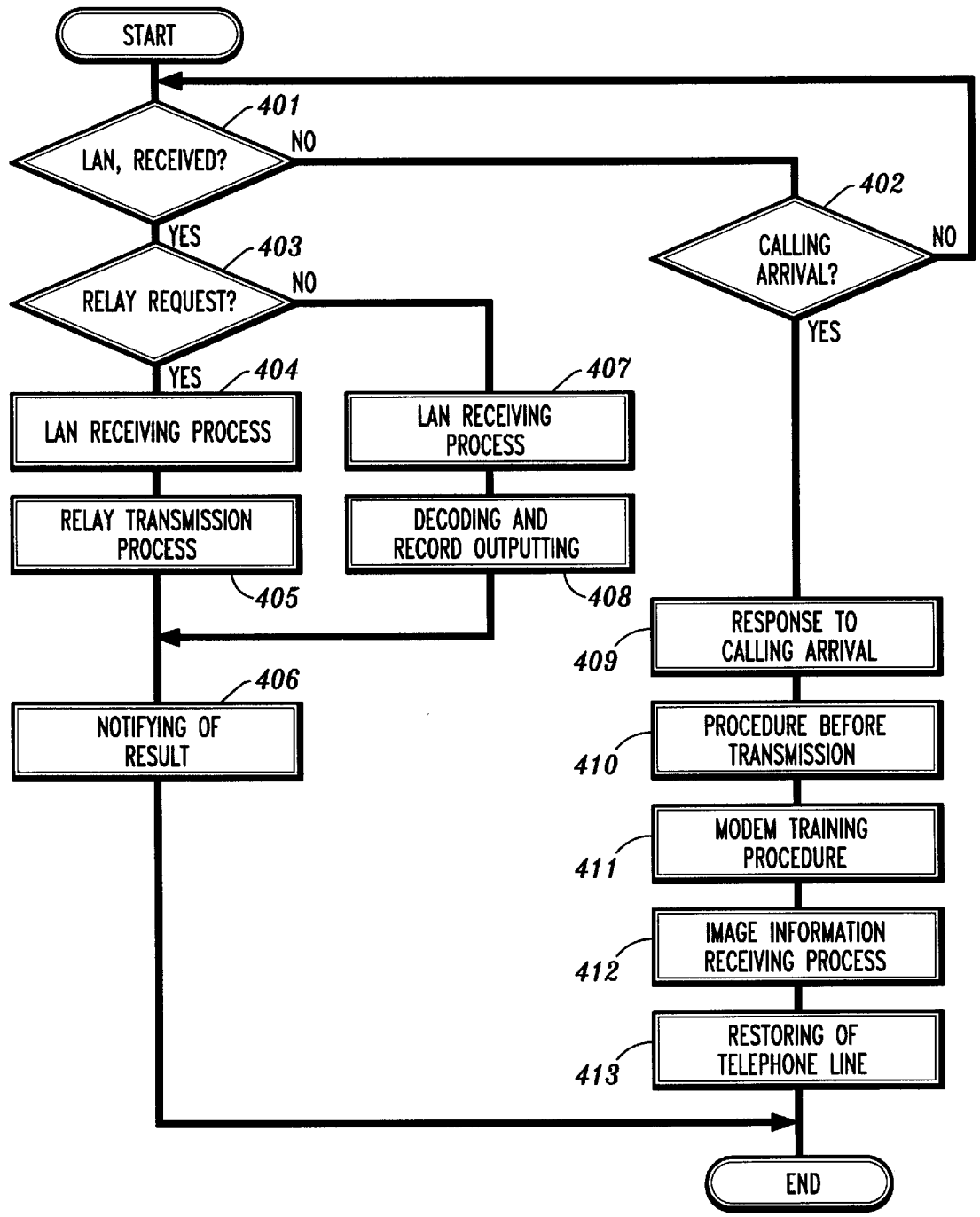
FIG. 11 is a flow chart showing another example of the processing at the time of facsimile device reception.

An example of processing at the time of receiving the signal at the side of the facsimile devices FA1 and FA2 is shown in FIG. 11. A determination is made in step 401 whether the signal is received from the local area networks LN1 and LN2. If No in step 401, a determination is made in step 402 whether the calling signal arrival is detected at the general exchanging network GSTN. When the signal is received from the local area networks LN1 and LN2 and the result of step 401 is YES, whether effective relayed address information is included in the data to be received and the relay requesting transmission is determined in step 403.

When the result of step 403 is YES, the local area network signal receiving process for receiving and preserving the data in accordance with the predetermined protocol (step 404), is performed. When the reception of the image information is completed, the relay transmission process for transmitting the image information received at that time to the corresponding partner's terminal at the telephone number contained in the relayed address information (step 405) is executed. Next, information of notifying the result of receiving the image information at that time is transmitted to the relay requesting terminal (step 406), and this operation is completed.

Furthermore, when the relay requesting transmission is not performed and the result of step 403 is NO, the local area network signal receiving process receiving and preserving the data in accordance with the predetermined protocol (step 407) is performed. When the reception of the image information is completed, the image information signal received at that time is decoded to the initial image data by the coding/decoding section 7 and the image data obtained thereby are recorded and outputted by the plotter 5 (step 408).

Next, the process is transferred to step 406 and the information for notifying the result of receiving the image information at that time is transmitted to the correspondence partner's terminal at that time. In such way, the above operation is completed.

Furthermore, when the calling signal arrival is detected at the general exchanging network GSTN and the result of step 402 is YES, the response to the calling signal arrival is done (step 409) and the predetermined pre-transmission procedure is executed (step 410). Moreover, in the pre-transmission procedure, the address information set to the self terminal is included in the non-standard function identifying signal NSF for notifying the non-standard transmitting function of the self terminal to the correspondence partner's terminal.

Next, the modem speed to be used for practicing the predetermined modem training procedure is determined (step 411). By practicing the predetermined image information receiving procedure, the image information is received and stored (step 412). When the reception of the image information is completed, the telephone line (circuit) is restored (step 413) and the above operation is completed. Moreover, on this occasion, the received image information is decoded to the initial image data by the coding/decoding section 7, and the image data obtained thereby are recorded and outputted by the plotter 5.

Furthermore, although the general exchanging network is employed in the above-mentioned respective embodiments, it is also possible to employ an ISDN instead of the above general exchanging network GSTN. On that occasion, it is also possible to provide the group-4 facsimile function instead of the group-3 facsimile function as the transmitting function of the facsimile device. Furthermore, on that occasion, it is also possible to provide both of the group-3 facsimile function and the group-4 facsimile function.

As is apparent from the foregoing description, according to the present invention, the correspondence partner's telephone number can be obtained by referring to the telephone number conversion table.

In case that the address is registered therein, the image information is transmitted through the internet. On the other hand, in case that the address is not registered, the image information is transmitted by use of the exchanging network. Consequently, it is not necessary to perform the operation of selecting the connection network of the correspondence partner one by one, and therefore the easiness of using the facsimile device system can be largely improved.

Furthermore, in general, since the local area networks are connected to the internet through the specialized telephone line, etc., if the facsimile communication is performed through the internet, the communication cost can be largely reduced compared with the case of performing the facsimile communication by use of the exchanging network.

Furthermore, when the calling signal is issued to the facsimile device connected only to the exchanging network, since the facsimile device is installed at the area adjacent to the correspondence partner among the facsimile devices capable of performing the communication through the internet for relaying the transmission of the image information, the communication cost in case that the location of the correspondence partner is distant from the facsimile sender can be largely reduced.

Heretofore, the facsimile device and the method of facsimile communication in relation to the embodiments according to the present invention have been described in detail. However, the present invention is not limited to those embodiments. For instance, in the other embodiment of the invention, the facsimile device system converts the image information to the information of the electronic mail style between the facsimile device and the internet and thereafter performs the facsimile communication.

In such embodiment, after the information of the electronic mail is tentatively stored in the mail servers, the stored information is transmitted to the correspondence partner.

On such occasion, when the value of the correspondence partner's address attached to the electronic mail includes the network addresses set in the respective domains, the electronic mail information is stored in the corresponding mail server terminals as it is. On the other hand, when the value includes a value other than the network addresses set in the respective domains, the information of the electronic mail is sent out to the internet, and further is transmitted to the suitable domains or hosts respectively having the network addresses corresponding to the values of the correspondence partner's addresses, by the action of the data transferring function of the internet.

On the other hand, the respective terminals (client terminals and internet facsimile device) make inquiries of the electronic mail reception addressed to the user of the self terminal. When the electronic mail addressed to the user is stored in the mail server terminal, it receives the electronic mail from the mail server terminals and notifies the user of the matter. However, on this occasion, the internet facsimile device treats the electronic address set in the self terminal as the user address.

What is claimed is:

1. A facsimile device comprising:
   local area network communication controlling means for exchanging data between said facsimile device and a terminal of a correspondence partner through a local area network connected to an internet;
   exchanging network communication controlling means for exchanging image information between said facsimile device and the terminal of said correspondence partner through an exchanging network in accordance with a predetermined facsimile transmitting procedure; and telephone number converting table means for registering telephone numbers used to place a call by use of said exchanging network and for registering a group of corresponding addresses for transmitting signals by use of said local area network, for the terminals of the respective correspondence partners, wherein, at a time of performing the transmitting operation, when a designated telephone number has been already registered in said telephone number converting table means, an address corresponding to the designated telephone number is looked up, and the image information is transmitted to said looked up address by use of said local area network communication controlling means, wherein, when a calling signal arrival from said exchanging network communication controlling means is detected by the terminal of said correspondence partner, there is included, in one of the signals of said predetermined facsimile transmitting procedure transmitted to the facsimile device from the terminal of said correspondence partner, address notifying information for notification of the address of the terminal of said correspondence partner, and wherein, when said address notifying information is included in said predetermined facsimile transmitting procedure signal received from the terminal of said correspondence partner, said facsimile device adds the address of said address notifying information and the telephone number of the terminal of said correspondence partner to said telephone number converting table means.

2. A facsimile device comprising:

local area network communication controlling means for exchanging data between said facsimile device and a terminal of a correspondence partner through a local area network connected to an internet;

exchanging network communication controlling means for exchanging image information between said facsimile device and the terminal of said correspondence partner through an exchanging network in accordance with a predetermined facsimile transmitting procedure; and telephone number converting table means for registering telephone numbers used to place a call by use of said exchanging network and for registering a group of corresponding addresses for transmitting signals by use of said local area network, for the terminals of the respective correspondence partners, wherein, at a time of performing the transmitting operation, when a designated telephone number has been already registered in said telephone number converting table means, an address corresponding to the designated telephone number is taken out, and the image information is transmitted to said looked up address by use of said local area network communication controlling means, and, when some designated telephone numbers have not yet been registered in said telephone number converting table means, a calling signal is respectively issued to said designated telephone numbers by use of said exchanging network communication controlling means, and said image information is transmitted to said respective designated telephone numbers, wherein, when a calling signal arrival from said exchanging network communication controlling means is detected by the terminal of said correspondence partner, there is included, in one of the signals of said predetermined facsimile transmitting procedure transmitted to the facsimile device from the terminal of said correspondence partner, address notifying information for notification of the address of the terminal of said correspondence partner, and wherein, when said address notifying information is included in said predetermined facsimile transmitting procedure signal received from the terminal of said correspondence partner, said facsimile device adds the address of said address notifying information and the telephone number of the terminal of said correspondence partner to said telephone number converting table means.

3. A facsimile device comprising:

local area network communication controlling means for exchanging data between said facsimile device and a terminal of a correspondence partner through a local area network connected to an Internet;

exchanging network communication controlling means for exchanging image information between said facsimile device and the terminal of said correspondence partner through an exchanging network in accordance with a predetermined facsimile transmitting procedure; and telephone number converting table means for registering telephone numbers used to place a call by use of said exchanging network and for registering a group of corresponding addresses for transmitting signals by use of said local area network, for the terminals of the respective correspondence partners, wherein, at a time of performing the transmitting operation, when a designated telephone number has been already registered in said telephone number converting table means, an address corresponding to the designated telephone number is looked up, and the image information is transmitted to said looked up address by use of said local area network communication controlling means, and when a transmission error of said image information that terminates a calling signal is issued to said designated telephone number by use of said exchanging network communication controlling means, the image information is transmitted once again, wherein, when a calling signal arrival from said exchanging network communication controlling means is detected by the terminal of said correspondence partner, there is included, in one of the signals of said predetermined facsimile transmitting procedure transmitted to the facsimile device from the terminal of said correspondence partner, address notifying information for notification of the address of the terminal of said correspondence partner, and wherein, when said address notifying information is included in said predetermined facsimile transmitting procedure signal received from the terminal of said correspondence partner, said facsimile device adds the address of said address notifying information and the telephone number of the terminal of said correspondence partner to said telephone number converting table means.

4. A facsimile device comprising:

local area network communication controlling means for exchanging data between said facsimile device and a terminal of a correspondence partner through a local area network connected to an Internet;

exchanging network communication controlling means for exchanging image information between said facsimile device and the terminal of said correspondence partner through an exchanging network in accordance with a predetermined group-3 facsimile transmitting procedure; and telephone number converting table means for registering telephone numbers used to place a call by use of said exchanging network and for registering a group of corresponding addresses for transmitting signals by use of said local area network, for the terminals of the respective correspondence partners, wherein, at a time of performing the transmitting operation, when a designated telephone number has been already registered in said telephone number converting table means, an address corresponding to the designated telephone number is looked up, and the image information is transmitted to said looked up address by use of said local area network communication controlling means, and when a transmission error of said image information that terminates a calling signal is issued to said designated telephone number by use of said exchanging network communication controlling means, the image information is transmitted once again, and when some designated telephone numbers have not yet been registered in said telephone number converting table means, the calling signal is respectively issued to said designated telephone numbers by use of said exchanging network communication controlling means, and said image information is transmitted to said respective designated telephone numbers, wherein, when a calling signal arrival from said exchanging network communication controlling means is detected by the terminal of said correspondence partner, there is included, in one of the signals of said predetermined group-3 facsimile transmitting procedure transmitted to the facsimile device from the terminal of said correspondence partner, address notifying information for notification of the address of the terminal of said correspondence partner, and wherein, when said address notifying information is included in said predetermined group-3 facsimile transmitting procedure signal received from the terminal of said correspondence partner, said facsimile device adds the address of said address notifying information and the telephone number of the terminal of said correspondence partner to said telephone number converting table means.

5. A facsimile device comprising:

local area network communication controlling means for exchanging data between said facsimile device and a terminal of a correspondence partner through a local area network connected to an internet;

exchanging network communication controlling means for exchanging image information between said facsimile device and the terminal of said correspondence partner through an exchanging network in accordance with a predetermined facsimile transmitting procedure; and telephone number converting table means for registering telephone numbers used to place a call by use of said exchanging network and for registering a group of corresponding addresses for transmitting signals by use of said local area network, for the terminals of the respective correspondence partners, wherein, at a time of performing the transmitting operation, when a designated telephone number has been already registered in said telephone number converting table means, an address corresponding to the designated telephone number is looked up, and said image information is transmitted to said looked up address by use of said local area network communication controlling means, and when some designated telephone numbers have not yet been registered in said telephone number converting table means, the telephone number converting table means is searched for an already registered adjacent telephone number from an area adjacent to the area of the designated telephone number, and if said adjacent telephone number in said adjacent area has been registered, a relay transmission to said designated telephone number is performed through the terminal of said adjacent telephone number in said adjacent area.

6. A method of facsimile communication comprising the steps of:

exchanging data between a facsimile device and a terminal of a correspondence partner through a local area network connected to an internet, by use of local area network communication controlling means;

exchanging image information between the facsimile device and the terminal of said correspondence partner through an exchanging network in accordance with a predetermined facsimile transmitting procedure, by use of exchanging network communication controlling means;

registering telephone numbers used to place a call by use of said exchanging network and a group of corresponding addresses for transmitting signals by use of said local area network, for the terminals of the respective correspondence partners, by use of telephone number converting table means;

looking up an address corresponding to a designated telephone number, at a time of performing the transmitting operation, when said designated telephone number has been already registered in the telephone number converting table means; and transmitting the image information to said looked up address by use of the local area network communication controlling means, wherein, when a calling signal arrival from said exchanging network communication controlling means is detected by the terminal of said correspondence partner, there is included, in one of the signals of said predetermined facsimile transmitting procedure transmitted to the facsimile device from the terminal of said correspondence partner, address notifying information for notification of the address of the terminal of said correspondence partner, and wherein, when said address notifying information is included in said predetermined facsimile transmitting procedure signal received from the terminal of said correspondence partner, said facsimile device adds the address of said address notifying information and the telephone number of the terminal of said correspondence partner to said telephone number converting table means.

7. A method of facsimile communication comprising the steps of:

exchanging data between a facsimile device and a terminal of a correspondence partner through a local area network connected to an internet, by use of local area network communication controlling means;

exchanging image information between the facsimile device and the terminal of said correspondence partner through an exchanging network in accordance with a predetermined facsimile transmitting procedure, by use of exchanging network communication controlling means;

registering telephone numbers used to place a call by use of said exchanging network and a group of corresponding addresses for transmitting signals by use of the local area network, for the terminals of the respective correspondence partners, by use of telephone number converting table means;

looking up an address corresponding to a designated telephone number, at a time of performing the transmitting operation, when the designated telephone number has been already registered in the telephone number converting table means;

transmitting the image information to the looked up address by use of the local area network communication controlling means; and respectively issuing a calling signal to said designated telephone numbers by use of the exchanging network communication controlling means and transmitting the image information to the respective designated telephone numbers, when some of the designated telephone numbers have not yet been registered in the telephone number converting table means, wherein, when a calling signal arrival from said exchanging network communication controlling means is detected by the terminal of said correspondence partner, there is included, in one of the signals of said predetermined facsimile transmitting procedure transmitted to the facsimile device from the terminal of said correspondence partner, address notifying information for notification of the address of the terminal of said correspondence partner, and wherein, when said address notifying information is included in said predetermined facsimile transmitting procedure signal received from the terminal of said correspondence partner, said facsimile device adds the address of said address notifying information and the telephone number of the terminal of said correspondence partner to said telephone number converting table means.

8. A method of facsimile communication comprising the steps of:

exchanging data between a facsimile device and a terminal of a correspondence partner through a local area network connected to an Internet, by use of local area network communication controlling means;

exchanging image information between the facsimile device and the terminal of the correspondence partner through an exchanging network in accordance with a predetermined facsimile transmitting procedure, by use of exchanging network communication controlling means;

registering telephone numbers used to place a call by use of the exchanging network and a group of corresponding addresses for transmitting signals by use of the local area network, for the terminals of the respective correspondence partners, by use of telephone number converting table means;

looking up an address corresponding to a designated telephone number, at a time of performing the transmitting operation, when the designated telephone number has been already registered in the telephone number converting table means;

transmitting the image information to the looked up address by use of the local area network communication controlling means; and placing the call to the designated telephone number by use of the exchanging network communication controlling means and transmitting the image information once again, when a transmission error of the image information terminates the call, wherein, when the call from the exchanging network communication controlling means is detected by the terminal of said correspondence partner, there is included, in one of the signals of said predetermined facsimile transmitting procedure transmitted to the facsimile device from the terminal of said correspondence partner, address notifying information for notification of the address of the terminal of said correspondence partner, and wherein, when said address notifying information is included in said predetermined facsimile transmitting procedure signal received from the terminal of said correspondence partner, said facsimile device adds the address of said address notifying information and the telephone number of the terminal of said correspondence partner to the telephone number converting table means.

9. A method of facsimile communication comprising the steps of:

exchanging data between a facsimile device and a terminal of a correspondence partner through a local area network connected to an Internet, by use of local area network communication controlling means;

exchanging image information between the facsimile device and the terminal of the correspondence partner through an exchanging network in accordance with a predetermined group-3 facsimile transmitting procedure, by use of exchanging network communication controlling means;

registering telephone numbers used to place a call by use of the exchanging network and a group of corresponding addresses for transmitting signals by use of the local area network, for the terminals of the respective correspondence partners, by use of telephone number converting table means;

looking up an address corresponding to a designated telephone number, at a time of performing the transmitting operation, when the designated telephone number has been already registered in the telephone number converting table means;

transmitting the image information to the looked up address by use of the local area network communication controlling means;

placing the call to said designated telephone number by use of the exchanging network communication controlling means and transmitting the image information once again, when a transmission error of said image information terminates the call; and respectively issuing a calling signal to said designated telephone numbers, by use of the exchanging network communication controlling means, and transmitting said image information to said respective designated telephone numbers, when some of the designated telephone numbers have not yet been registered in the telephone number converting table means, wherein, when the call from the exchanging network communication controlling means is detected by the terminal of said correspondence partner, there is included, in one of the signals of said predetermined group-3 facsimile transmitting procedure transmitted to the facsimile device from the terminal of said correspondence partner, address notifying information for notification of the address of the terminal of said correspondence partner, and wherein, when said address notifying information is included in said predetermined group-3 facsimile transmitting procedure signal received from the terminal of said correspondence partner, said facsimile device adds the address of said address notifying information and the telephone number of the terminal of said correspondence partner to the telephone number converting table means.

10. A method of facsimile communication comprising the steps of:

exchanging data between a facsimile device and a terminal of a correspondence partner through a local area network connected to an internet, by use of local area network communication controlling means;

exchanging image information between the facsimile device and the terminal of the correspondence partner through an exchanging network in accordance with a predetermined facsimile transmitting procedure, by use of exchanging network communication controlling means;

registering telephone numbers used to place a call by use of the exchanging network and a group of corresponding addresses for transmitting signals by use of the local area network, for the terminals of the respective correspondence partners, by use of telephone number converting table means;

looking up an address corresponding to a designated telephone number, at a time of performing the transmitting operation, when said designated telephone number has been already registered in the telephone number converting table means;

transmitting the image information to the looked up address by use of the local area network communication controlling means; and searching the telephone number converting table means for an already registered adjacent telephone number from an area adjacent to the area of the designated telephone number, when some of the designated telephone numbers have not yet been registered in the telephone number converting table means, and performing a relay transmission to said designated telephone number through the terminal of said adjacent telephone number in said adjacent area if said adjacent telephone number in said adjacent area has been registered.

11. A facsimile device as recited in claim 1, wherein said local area network communication controlling means converts image data into an electronic mail format prior to exchange between said facsimile device and the terminal of the correspondence partner.

12. A facsimile device as recited in claim 11, wherein the electronic mail is stored in a mail server prior to transmission to the correspondence partner.

13. A facsimile device comprising:

a local area network communication controlling apparatus, connected to an internal bus, for exchanging data between said facsimile device and a terminal of a correspondence partner through a local area network connected to an internet;

an exchanging network communication controlling apparatus, connected to the internal bus, for exchanging image information between said facsimile device and the terminal of said correspondence partner through an exchanging network in accordance with a predetermined facsimile transmitting procedure; and a telephone number conversion table, stored in a parameter memory connected to the internal bus, for registering telephone numbers used to place a call by use of said exchanging network and for registering a group of corresponding addresses for transmitting signals by use of said local area network, for the terminals of the respective correspondence partners, wherein, at a time of performing the transmitting operation, when a designated telephone number has been already registered in said telephone number conversion table, an address corresponding to the designated telephone number is looked up, and the image information is transmitted to said looked up address by use of said local area network communication controlling apparatus, wherein, when a calling signal arrival from said exchanging network communication controlling apparatus is detected by the terminal of said correspondence partner, there is included, in one of the signals of said predetermined facsimile transmitting procedure transmitted to the facsimile device from the terminal of said correspondence partner, address notifying information for notification of the address of the terminal of said correspondence partner, and wherein, when said address notifying information is included in said predetermined facsimile transmitting procedure signal received from the terminal of said correspondence partner, said facsimile device adds the address of said address notifying information and the telephone number of the terminal of said correspondence partner to said telephone number conversion table.

14. A facsimile device comprising:

a local area network communication controlling apparatus, connected to an internal bus, for exchanging data between said facsimile device and a terminal of a correspondence partner through a local area network connected to an internet;

an exchanging network communication controlling apparatus, connected to the internal bus, for exchanging image information between said facsimile device and the terminal of said correspondence partner through an exchanging network in accordance with a predetermined facsimile transmitting procedure; and a telephone number conversion table, stored in a parameter memory connected to the internal bus, for registering telephone numbers used to place a call by use of said exchanging network and for registering a group of corresponding addresses for transmitting signals by use of said local area network, for the terminals of the respective correspondence partners, wherein, at a time of performing the transmitting operation, when a designated telephone number has been already registered in said telephone number conversion table, an address corresponding to the designated telephone number is looked up, and said image information is transmitted to said looked up address by use of said local area network communication controlling apparatus, and when some designated telephone numbers have not yet been registered in said telephone number conversion table, the telephone number conversion table is searched for an already registered adjacent telephone number from an area adjacent to the area of the designated telephone number, and if said adjacent telephone number in said adjacent area has been registered, a relay transmission to said designated telephone number is performed through the terminal of said adjacent telephone number in said adjacent area.

* * * * *